(12) United States Patent
Badar et al.

(10) Patent No.: US 10,175,442 B2
(45) Date of Patent: *Jan. 8, 2019

(54) ADAPTER PLATE FOR FIBER OPTIC MODULE

(71) Applicant: CommScope Technologies LLC, Hickory, NC (US)

(72) Inventors: Timothy G. Badar, Redwood City, CA (US); John T. Pfarr, Le Sueur, MN (US); Robert Bachtell, Minneapolis, MN (US); Gustavo Garcia, Chihuahua (MX)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/692,770

(22) Filed: Aug. 31, 2017

(65) Prior Publication Data

US 2018/0129007 A1   May 10, 2018

Related U.S. Application Data

(63) Continuation of application No. 14/935,766, filed on Nov. 9, 2015, now Pat. No. 9,753,238, which is a
(Continued)

(51) Int. Cl.
*G02B 6/44* (2006.01)

(52) U.S. Cl.
CPC ......... *G02B 6/4455* (2013.01); *G02B 6/4452* (2013.01); *Y10T 29/4987* (2015.01)

(58) Field of Classification Search
None
See application file for complete search history.

(56) References Cited

U.S. PATENT DOCUMENTS

| 4,435,612 A | 3/1984 | Smith |
| 4,650,933 A | 3/1987 | Benda et al. |

(Continued)

FOREIGN PATENT DOCUMENTS

| CN | 1656405 | 8/2005 |
| CN | 101384938 | 3/2009 |

(Continued)

OTHER PUBLICATIONS

OmniReach™ FONS Fiber Distribution Hub Plug and Play Splitter Retrofit Bracket Kit, Installation Instructions, ADCP-96-129, Issue 2, 2 pages (Nov. 2007).

(Continued)

*Primary Examiner* — Tina M Wong
(74) *Attorney, Agent, or Firm* — Merchant & Gould P.C.

(57) ABSTRACT

An adapter plate for use with a telecommunications module that is configured to be slidably inserted into a first type of telecommunications chassis comprises a body configured to be mounted to the telecommunications module. The body of the adapter plate includes structure for mounting the telecommunications module to a second type of telecommunications chassis that is different than the first type of telecommunications chassis, wherein the telecommunications module is not configured to be mounted to the second type of telecommunications chassis without the adapter plate.

17 Claims, 14 Drawing Sheets

Related U.S. Application Data continuation of application No. 13/432,762, filed on Mar. 28, 2012, now Pat. No. 9,182,563.

(60) Provisional application No. 61/470,222, filed on Mar. 31, 2011.

(56) References Cited

U.S. PATENT DOCUMENTS

| | | |
|---|---|---|
| 4,768,961 A | 9/1988 | Lau |
| 4,770,639 A | 9/1988 | Lau |
| 4,797,114 A | 1/1989 | Lau |
| 4,820,200 A | 4/1989 | Lau |
| 4,824,196 A | 4/1989 | Bylander |
| 4,840,568 A | 6/1989 | Burroughs et al. |
| 4,850,901 A | 7/1989 | Smith et al. |
| 5,189,410 A | 2/1993 | Kosugi et al. |
| 5,199,878 A | 4/1993 | Dewey et al. |
| 5,214,673 A | 5/1993 | Morgenstern et al. |
| 5,285,515 A | 2/1994 | Milanowski et al. |
| 5,317,663 A | 5/1994 | Beard et al. |
| 5,339,379 A | 8/1994 | Kutsch et al. |
| 5,363,465 A | 11/1994 | Korkowski et al. |
| 5,393,249 A | 2/1995 | Morgenstern et al. |
| 5,432,875 A | 7/1995 | Korkowski et al. |
| 5,467,062 A | 11/1995 | Burroughs |
| 5,497,444 A | 3/1996 | Wheeler |
| 5,582,525 A | 12/1996 | Louwagie et al. |
| 5,613,030 A | 3/1997 | Hoffer et al. |
| 5,627,925 A | 5/1997 | Alferness et al. |
| 5,647,045 A | 7/1997 | Robinson et al. |
| 5,685,741 A | 11/1997 | Dewey et al. |
| 5,694,511 A | 12/1997 | Pimpinella et al. |
| 5,701,380 A | 12/1997 | Larson et al. |
| 5,717,810 A | 2/1998 | Wheeler |
| 5,946,440 A | 8/1999 | Puetz |
| 5,975,769 A | 11/1999 | Larson et al. |
| 6,116,961 A | 9/2000 | Henneberger et al. |
| 6,195,493 B1 | 2/2001 | Bridges |
| 6,208,796 B1 | 3/2001 | Williams Vigliaturo |
| 6,226,111 B1 | 5/2001 | Chang et al. |
| 6,226,434 B1 | 5/2001 | Koshiyama et al. |
| 6,263,136 B1 | 7/2001 | Jennings et al. |
| 6,307,998 B2 | 10/2001 | Williams Vigliaturo |
| 6,328,608 B1 | 12/2001 | Olson et al. |
| 6,363,183 B1 | 3/2002 | Koh |
| 6,370,294 B1 | 4/2002 | Pfeiffer et al. |
| 6,385,381 B1 | 5/2002 | Janus et al. |
| 6,418,262 B1 | 7/2002 | Puetz et al. |
| 6,424,781 B1 | 7/2002 | Puetz et al. |
| 6,424,783 B1 | 7/2002 | Hara |
| 6,471,414 B2 | 10/2002 | Carberry et al. |
| 6,511,330 B1 | 1/2003 | Norris |
| 6,515,227 B1 | 2/2003 | Massey et al. |
| 6,532,332 B2 | 3/2003 | Solheid et al. |
| 6,535,682 B1 | 3/2003 | Puetz et al. |
| 6,554,652 B1 | 4/2003 | Musolf et al. |
| 6,556,738 B2 | 4/2003 | Pfeiffer et al. |
| 6,556,763 B1 | 4/2003 | Puetz et al. |
| 6,579,014 B2 | 6/2003 | Melton et al. |
| 6,591,051 B2 | 7/2003 | Solheid et al. |
| 6,599,024 B2 | 7/2003 | Zimmel |
| 6,614,953 B2 | 9/2003 | Strasser et al. |
| 6,616,459 B2 | 9/2003 | Norris |
| 6,632,106 B2 | 10/2003 | Musolf et al. |
| RE38,311 E | 11/2003 | Wheeler |
| 6,647,197 B1 | 11/2003 | Marrs et al. |
| 6,668,108 B1 | 12/2003 | Helkey et al. |
| 6,688,780 B2 | 2/2004 | Duran |
| 6,711,339 B2 | 3/2004 | Puetz et al. |
| 6,719,382 B2 | 4/2004 | Sucharczuk et al. |
| 6,721,484 B1 | 4/2004 | Blankenship et al. |
| 6,760,531 B1 | 7/2004 | Solheid et al. |
| 6,761,594 B2 | 7/2004 | Johnsen et al. |
| 6,768,860 B2 | 7/2004 | Liberty |
| 6,810,193 B1 | 10/2004 | Muller |
| 6,822,874 B1 | 11/2004 | Marler |
| 6,824,312 B2 | 11/2004 | McClellan et al. |
| 6,830,465 B2 | 12/2004 | Norris et al. |
| 6,832,035 B1 | 12/2004 | Daoud et al. |
| 6,848,952 B2 | 2/2005 | Norris |
| 6,850,685 B2 | 2/2005 | Tinucci et al. |
| 6,863,446 B2 | 3/2005 | Ngo |
| 6,885,798 B2 | 4/2005 | Zimmel |
| 6,890,187 B2 | 5/2005 | Norris |
| 6,937,807 B2 | 8/2005 | Franklin et al. |
| 6,983,095 B2 | 1/2006 | Reagan et al. |
| 7,029,322 B2 | 4/2006 | Ernst et al. |
| 7,058,257 B2 | 6/2006 | Pan et al. |
| 7,110,527 B2 | 9/2006 | Skraddle et al. |
| 7,118,284 B2 | 10/2006 | Nakajima et al. |
| 7,139,461 B2 | 11/2006 | Puetz et al. |
| 7,142,764 B2 | 11/2006 | Allen et al. |
| 7,190,874 B1 | 3/2007 | Barth et al. |
| 7,194,181 B2 | 3/2007 | Holmberg et al. |
| 7,218,827 B2 | 5/2007 | Vongseng et al. |
| 7,233,731 B2 | 6/2007 | Solheid et al. |
| 7,245,809 B1 | 7/2007 | Gniadek et al. |
| 7,303,220 B2 | 12/2007 | Zellak |
| 7,310,474 B2 | 12/2007 | Kanasaki et al. |
| 7,333,606 B1 | 2/2008 | Swam et al. |
| 7,346,254 B2 | 3/2008 | Kramer et al. |
| 7,362,941 B2 | 4/2008 | Rinderer et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,416,349 B2 | 8/2008 | Kramer |
| 7,418,181 B2 | 8/2008 | Zimmel et al. |
| 7,453,706 B2 | 11/2008 | Clark et al. |
| 7,470,068 B2 | 12/2008 | Kahle et al. |
| 7,495,931 B2 | 2/2009 | Clark et al. |
| 7,536,075 B2 | 5/2009 | Zimmel |
| 7,542,649 B1 | 6/2009 | Andersen |
| 7,590,328 B2 | 9/2009 | Reinhardt et al. |
| 7,606,459 B2 | 10/2009 | Zimmel et al. |
| 7,636,507 B2 | 12/2009 | Lu et al. |
| 7,764,858 B2 | 7/2010 | Bayazit et al. |
| 7,835,611 B2 | 11/2010 | Zimmel |
| 7,853,112 B2 | 12/2010 | Zimmel et al. |
| 7,885,505 B2 | 2/2011 | Zimmel |
| 7,889,961 B2 | 2/2011 | Cote et al. |
| 7,912,336 B2 | 3/2011 | Zimmel |
| 8,009,954 B2 | 8/2011 | Bran de Leon et al. |
| 8,325,494 B2 | 12/2012 | Kimbrell et al. |
| 8,346,045 B2 | 1/2013 | Zimmel et al. |
| 8,428,418 B2 | 4/2013 | Smrha |
| 9,182,563 B2 | 11/2015 | Badar et al. |
| 9,753,238 B2 * | 9/2017 | Badar ............... G02B 6/4455 |
| 2005/0232551 A1 | 10/2005 | Chang et al. |
| 2005/0232565 A1 | 10/2005 | Heggestad et al. |
| 2007/0025675 A1 | 2/2007 | Kramer |
| 2007/0036503 A1 | 2/2007 | Solheid et al. |
| 2010/0129030 A1 | 5/2010 | Giraud et al. |
| 2010/0158465 A1 | 6/2010 | Smrha |
| 2011/0019964 A1 | 1/2011 | Nhep et al. |
| 2018/0129007 A1 * | 5/2018 | Badar ............... G02B 6/4452 |

FOREIGN PATENT DOCUMENTS

| | | |
|---|---|---|
| CN | 101836147 | 9/2010 |
| CN | 101677412 | 2/2013 |
| DE | 4130706 | 3/1993 |
| DE | 20201170 | 5/2002 |
| EP | 0730177 | 9/1996 |
| EP | 0828356 | 3/1998 |
| EP | 1092996 | 4/2001 |
| EP | 1107031 | 6/2001 |
| EP | 1179745 | 2/2002 |
| EP | 1473578 | 11/2004 |
| GB | 2300978 | 11/1996 |
| WO | WO 96/36896 | 11/1996 |
| WO | WO 00/75706 | 12/2000 |
| WO | WO 02/099528 | 12/2002 |

(56) References Cited

FOREIGN PATENT DOCUMENTS

| WO | WO 02/103429 | 12/2002 |
| WO | WO 03/093889 | 11/2003 |
| WO | WO 2006/127397 | 11/2006 |

OTHER PUBLICATIONS

ADC Telecommunications, Inc., DS3 Digital Signal Cross-Connect (DSX3) System Application Guide, Document No. ADCP-80-323, 1st Edition, Issue 2, Dec. 1996, p. 1-10; p. 1-11.

ADC Telecommunications, Inc., DSX-1 Digital Signal Cross Connect PIX-DSX-1—Fifth Edition, Document No. 257, Nov. 1994, 36 Pages.

ADC Telecommunications, Inc., DSX-3 Digital Signal Cross-Connect, Front and Rear Cross-Connect Products—Second Edition, Document No. 274, Oct. 2004, 65 pages.

ADC Telecommunications, Inc., OmniReach™ FTTP Solutions, Document No. 1276550, May 2004, 12 pp.

ADC Telecommunications, Inc., PxPlus™ DS1 Digital Signal Cross-Connect, Document No. 267, Jan. 1997, 12 Pages.

\* cited by examiner

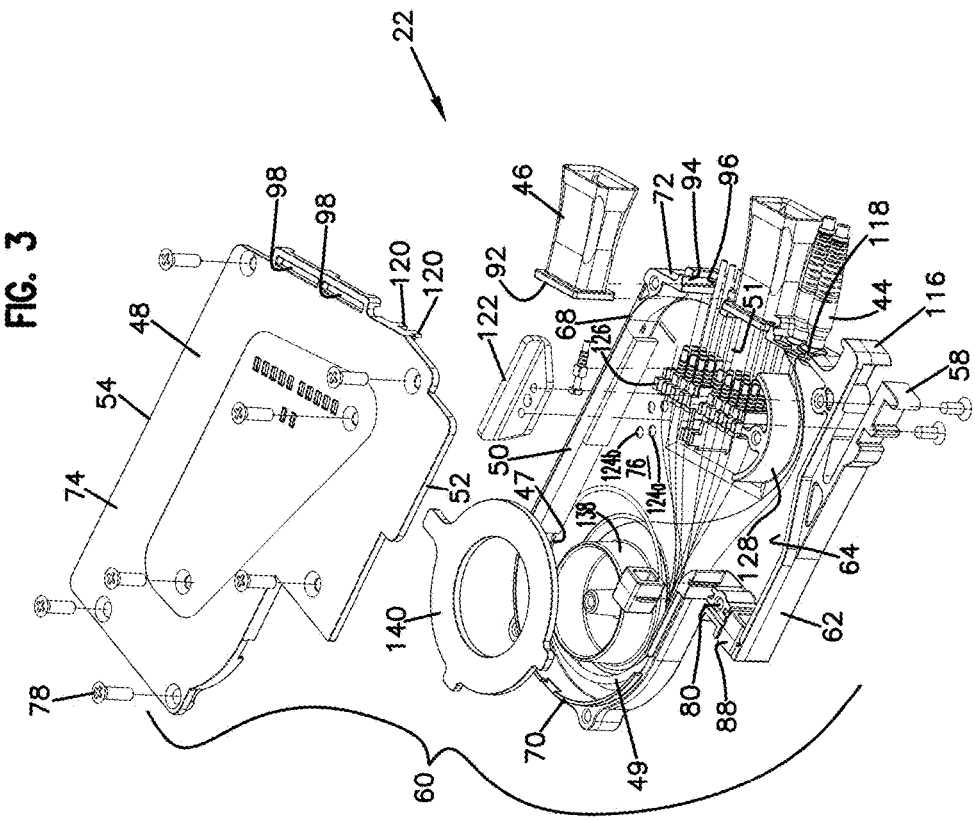
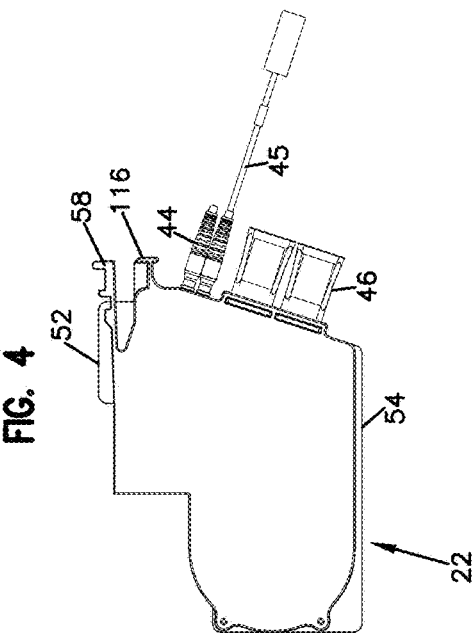

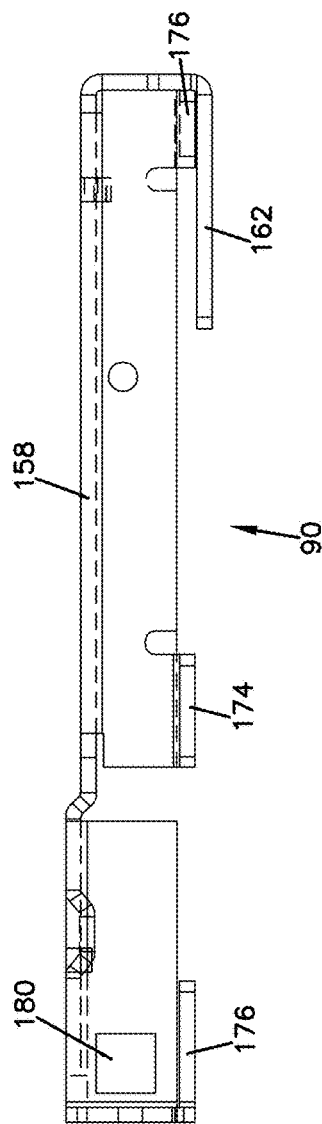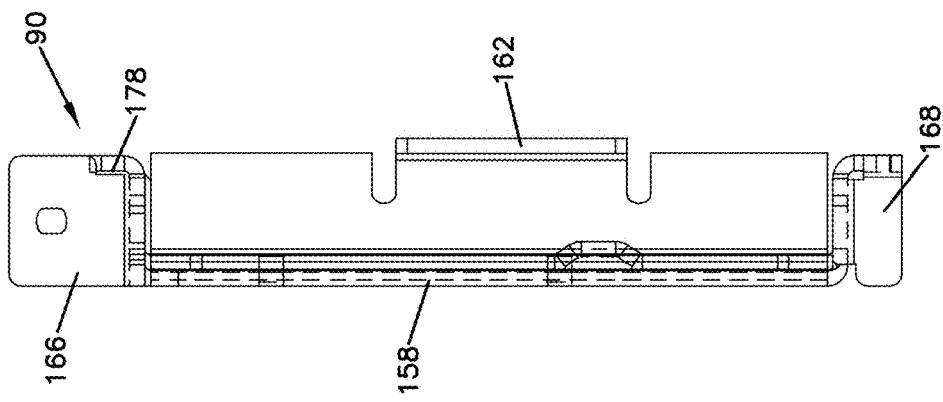

ADAPTER PLATE FOR FIBER OPTIC MODULE

CROSS REFERENCE TO RELATED APPLICATION

This application is a continuation of U.S. patent application Ser. No. 14/935,766, filed Nov. 9, 2015, now U.S. Pat. No. 9,753,238, which is a continuation of U.S. patent application Ser. No. 13/432,762, filed Mar. 28, 2012, now U.S. Pat. No. 9,182,563, which claims the benefit of U.S. Provisional Patent Application Ser. No. 61/470,222, filed Mar. 31, 2011, which applications are hereby incorporated by reference in their entirety.

FIELD

The present disclosure generally relates to fiber optic telecommunications equipment. More specifically, the present disclosure relates to an adapter plate for use with a fiber optic module, wherein the fiber optic module is normally configured to be mounted to a first piece of telecommunications equipment without the adapter plate, and wherein the adapter plate allows the fiber optic module to be mounted to a different second piece of telecommunications equipment.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting chassis capable of mounting multiple modules may be used in such an installation.

The types of chassis for mounting modules may vary depending upon the application, the capacity, and the location thereof. The modules that include the fiber optic equipment are normally specifically designed for a given chassis. What is needed is a system that allows a module that is configured for a first type of chassis to be able to be installed in a second type of chassis without having to modify the external and internal features of the module.

SUMMARY

The present invention relates to an adapter plate for use with a fiber optic module, wherein the fiber optic module is normally configured to be mounted to a first piece of telecommunications equipment without the adapter plate, and wherein the adapter plate allows the fiber optic module to be mounted to a second piece of telecommunications equipment having a different configuration than the first piece of telecommunications equipment.

According to one aspect of the present disclosure, the adapter plate slidably and removably mounts on the exterior of the fiber optic module for converting the configuration of the module for installation in a type of telecommunications equipment that is different than the type of telecommunications equipment that the module was configured for without the adapter plate.

According to another aspect of the present disclosure, an adapter plate for use with a telecommunications module that is configured to be slidably inserted into a first type of telecommunications chassis comprising a body configured to be mounted to the telecommunications module. The body of the adapter plate includes a structure for mounting the telecommunications module to a second type of telecommunications chassis that is different than the first type of telecommunications chassis, wherein the telecommunications module is not configured to be mounted to the second type of telecommunications chassis without the adapter plate.

According to another aspect of the present disclosure, the adapter plate is for use with a telecommunications module that includes a flexible latch for interlocking with a first type of telecommunications chassis. The adapter plate comprises a body configured to be mounted to the telecommunications module and interlocked with the telecommunications module using the flexible latch of the telecommunications module, wherein the body of the adapter plate includes a second latch for interlocking with a second type of telecommunications chassis that is different than the first type of telecommunications chassis, wherein the flexible latch of the telecommunications module is not configured for interlocking with the second type of telecommunications chassis.

According to another aspect, a method of mounting a telecommunications module to a second type of telecommunications chassis is disclosed, wherein the telecommunications module is normally configured for mounting to a first telecommunications chassis with a flexible latch, and the second telecommunications chassis is different than the first telecommunications chassis such that the flexible latch is not configured for mounting to the second telecommunications chassis.

BRIEF DESCRIPTION OF THE DRAWINGS

The accompanying drawings, which are incorporated in and constitute a part of the description, illustrate several aspects of the inventive features and together with the detailed description, serve to explain the principles of the disclosure. A brief description of the drawings is as follows:

FIG. 3 illustrates an exploded view of one of the prior art fiber optic modules shown installed in the fiber termination block of FIG. 1;

FIG. 4 is left side view of the fiber optic module of FIG. 3;

FIG. 5 is a right side view of the fiber optic module of FIG. 3;

FIG. 15 is a front view of the adapter plate of FIG. 13;

FIG. 16 is a top view of the adapter plate of FIG. 13;

DETAILED DESCRIPTION

Reference will now be made in detail to exemplary aspects of the present invention which are illustrated in the accompanying drawings. Wherever possible, the same reference numbers will be used throughout the drawings to refer to the same or similar parts.

Figure 1:
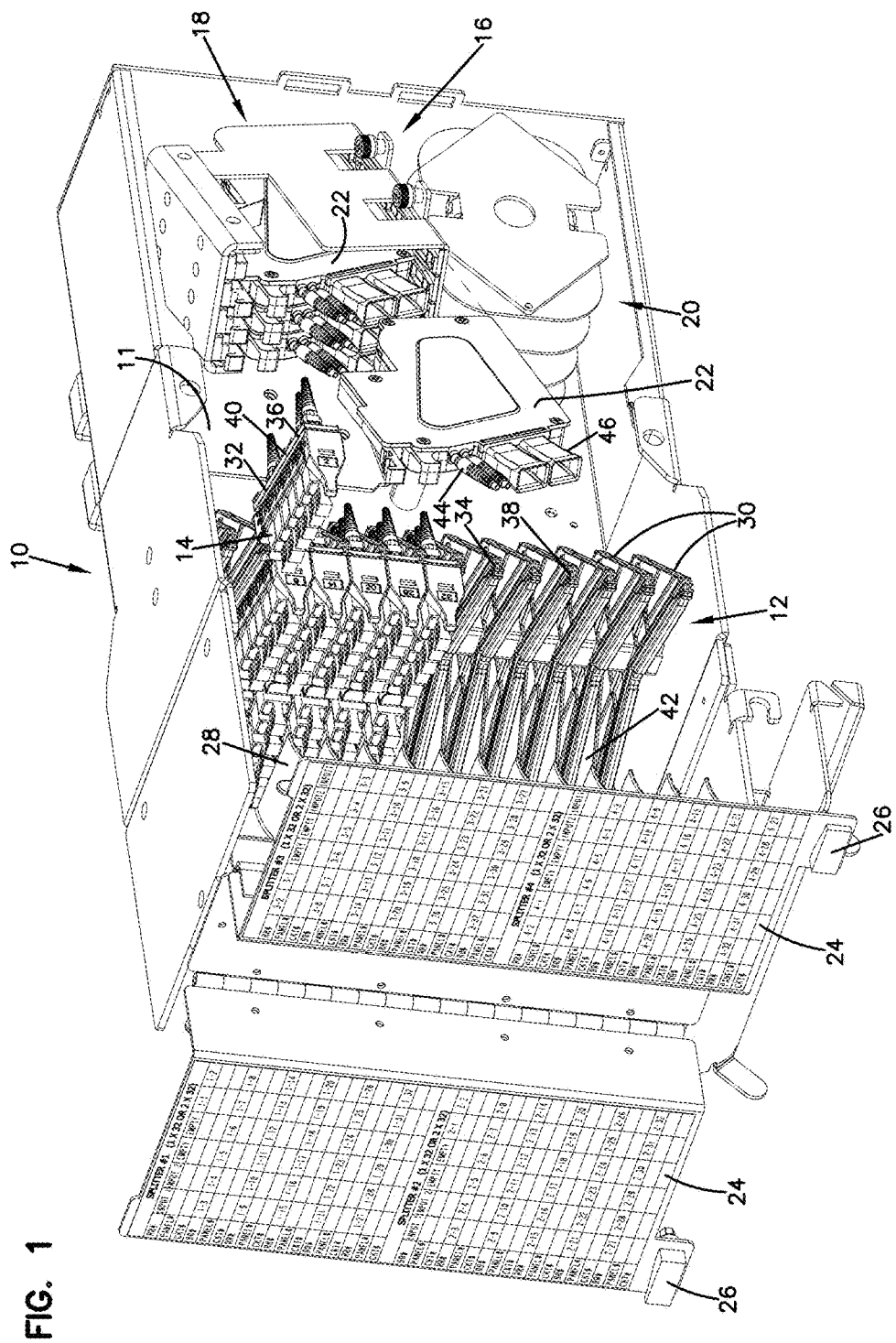
FIG. 1 is a front perspective view of a prior art fiber termination block that is configured to be mounted in a high-density fiber distribution frame, shown with a fiber optic module exploded off a module chassis of the fiber termination block.

FIG. 1 illustrates a prior art fiber termination block 10 that is configured to be mounted in a high-density fiber distribution frame. The fiber termination block 10 includes a front area 12 which defines a plurality of fiber optic terminations, such as adapters 14 which connect axially aligned fiber optic connectors. A rear area 16 of block 10 defines a fiber optic module chassis 18 and a slack storage area 20. As will be discussed in further detail below, the fiber optic modules 22 to be used in the block 10 can include various types of fiber optic equipment, such as for increasing capacity. The example embodiments of the fiber optic modules that will be described in the present application are splitter modules 22 that are configured to split an input signal into a plurality of the same output signals.

Still referring to FIG. 1, the fiber termination block 10 includes a plurality of covers to selectively protect internal components. Termination access panels 24 protect the front area 12 and the fiber optic terminations contained therein. A rear access cover (not shown) protects module chassis 18 and slack storage areas 20. Latches 26 allow for selective pivoting of panels 24 or removal of the cover. The fiber termination block 10 and the features thereof are described in further detail in U.S. Pat. No. 7,590,328, the entire disclosure of which is herein incorporated by reference.

In FIG. 1, the fiber termination block 10 is shown as including front radius limiters 28 and divider walls 30. Divider walls 30 receive slidable adapter modules 32. Divider walls 30 and adapter modules 32 are preferably constructed as described in U.S. Pat. No. 6,591,051, the entire disclosure of which is herein incorporated by reference. Additional sliding adapter arrangements are described in U.S. Pat. Nos. 5,497,444, 5,717,810, and 7,416,349, the entire disclosures of which are herein incorporated by reference. Divider walls 30 define longitudinal guides 34 for receiving longitudinal guides 36 of the sliding adapter modules 32. Guides 34 are shown in the form of channels 38, and guides 36 are shown in the form of rails 40. Each adapter module 32 includes a plurality of adapters 14 for receiving and connecting two fiber optic connectors. SC type connectors and mating adapters are shown. Divider walls 30 define a left side and right side for left and right adapter modules 32 to slide in opposite directions. Spaces or slots 42 between divider walls 30 each receive one of the adapter modules 32 during use.

Figure 2:
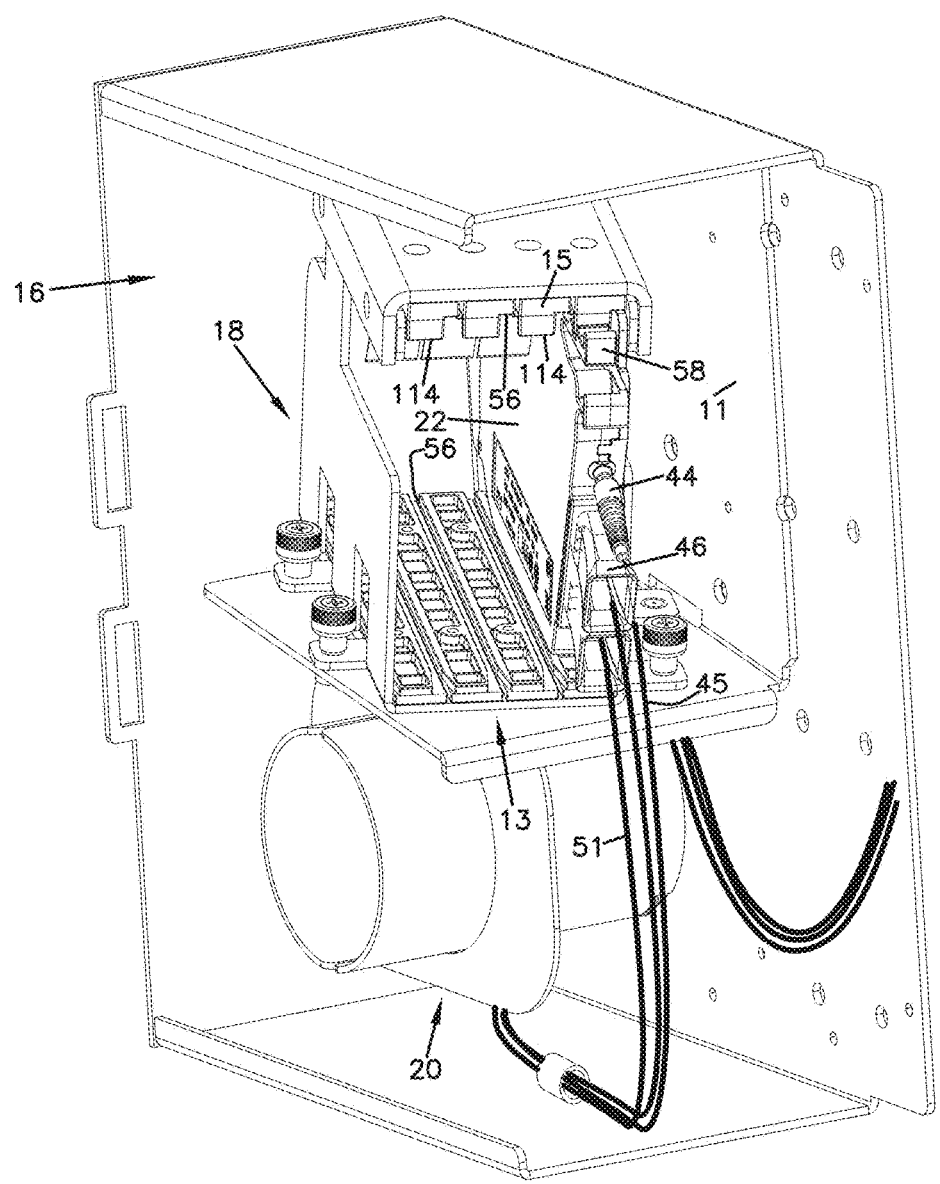
FIG. 2 illustrates a closer view of the module chassis of the fiber termination block of FIG. 1, the module chassis shown with one fiber optic module mounted therein.
Figure 6:
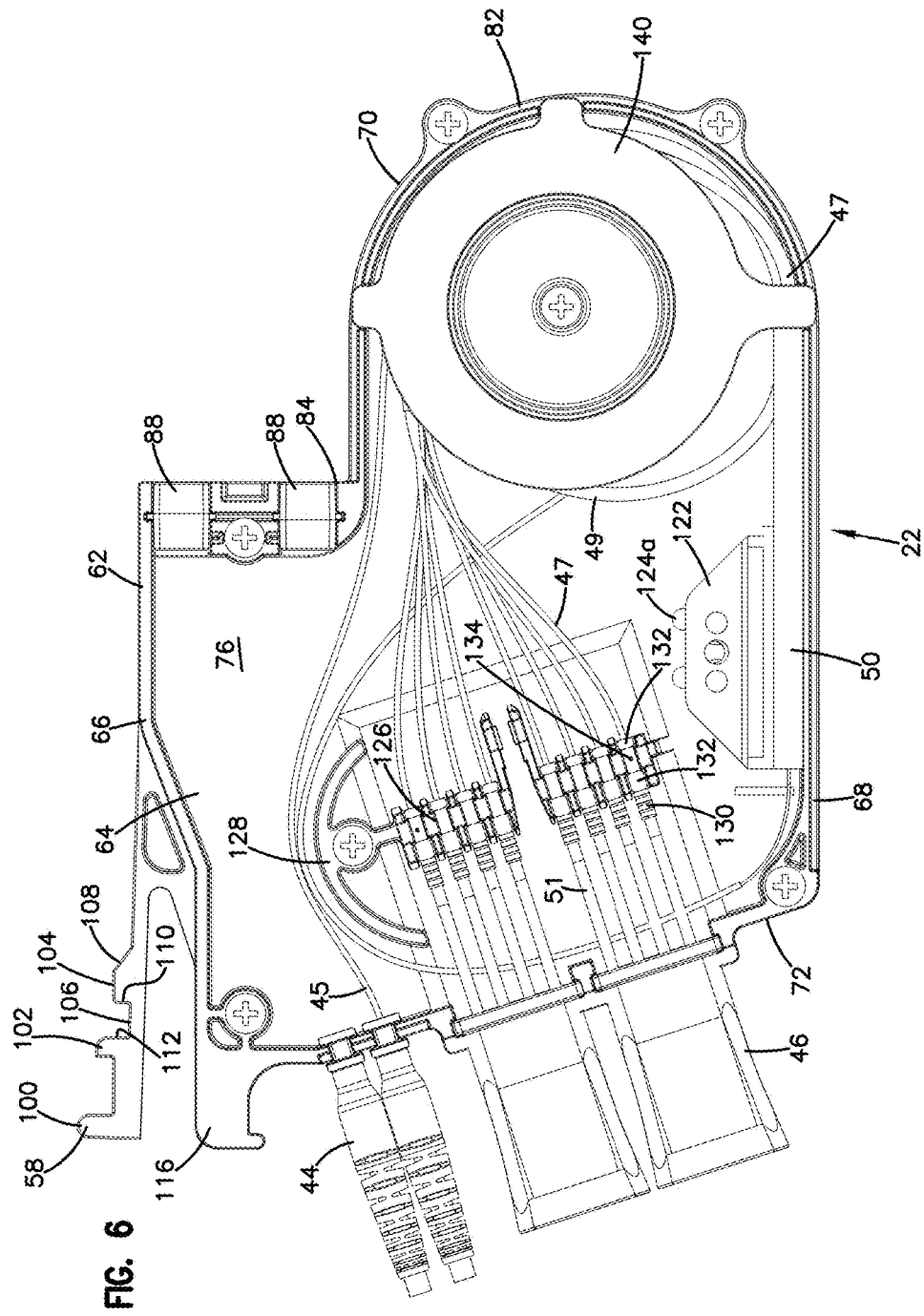
FIG. 6 is a right side view of the fiber optic module of FIG. 3, shown without the cover thereof, exposing the interior features of the fiber optic module.
Figure 7:
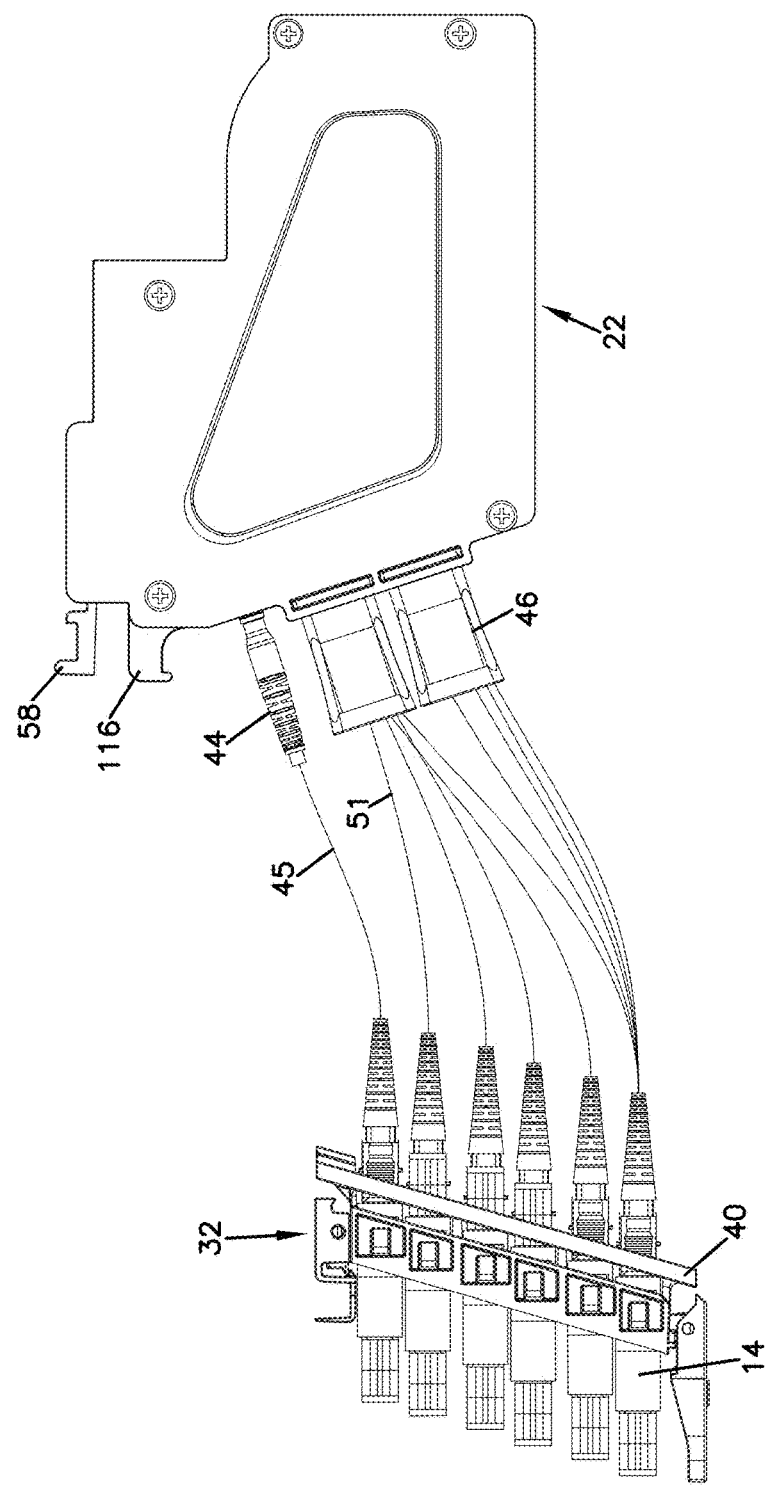
FIG. 7 illustrates the fiber optic module of FIG. 3 in combination with a prior art fiber optic adapter module configured to hold a plurality of fiber optic adapters, the fiber optic adapter module also configured for installation in a piece of telecommunications equipment such as the fiber termination block as shown in FIG. 1.

Now referring to FIGS. 1-2, the chassis 18 positioned in the rear area 16 of the fiber termination block 10 is configured for holding one or more fiber optic modules 22. Signals output from the modules 22 are directed to the adapter modules 32 positioned on the front area 12 of the fiber termination block 10. As noted above, the fiber optic modules 22 housed in the chassis 18 may be configured to include different types of fiber optic equipment such as splitters, fan-outs, multiplexers/demultiplexers, combiners, filters, etc. The example shown and described in the present application and that is configured for the high-density fiber termination block 10 shown in FIG. 1 is a fiber optic splitter module 22. Each fiber optic splitter module 22 includes at least one input 44 and a plurality of outputs 46. The inputs 44 and the outputs 46 are provided by connectorized cables 45, 51, respectively as seen in FIGS. 3, 6, and 7.

Now referring to FIGS. 3-7, one of the modules 22 mounted within the chassis 18 of the fiber termination block 10 is shown in closer detail. It should be noted that the module 22 shown in the FIGS. of the present application can be configured to have a front input location or a rear input location. The front input location may include one or more inputs 44 provided by one or more cables. The module 22 is shown as a single input module in FIGS. 2 and 7 and is shown as a dual-input module in FIGS. 1 and 3-6. As will be described in further detail below, the cover 48 of the module 22 allows the module 22 to be converted between a single or a dual-input module. The splitters 50 provided in the modules 22 can be any configuration desired by the customer, including for example 1×32, 1×16, or dual 1×16 splitters. If splitter module 22 only has one input 44, then only one input cable is provided. If dual inputs 44 are desired, then two input cables are used as shown in FIGS. 1 and 3-6.

It will be noted that the splitter module 22 shown and described herein is simply one example of a fiber optic module that is used to describe the inventive principles of the present disclosure and that the inventive aspects may be applicable to other types of modules. For example, U.S. Pat. No. 7,885,505, the entire disclosure of which is herein incorporated by reference, describes different versions of the module shown in the present application, some having front inputs, some having rear inputs, some including different fiber optic equipment therein such as an optical wavelength division multiplexer/demultiplexer.

Still referring to FIGS. 3-7, each splitter module 22 includes flanges 52, 54 formed by the cover 48 of the module which are received in mounting channels/slots 56 defined by mounting locations 15 in chassis 18. In the embodiment illustrated in FIGS. 1-2, the module chassis 18 defines four mounting channels/slots 56 for receiving four splitter modules 22 from an open front end 13. When mounting the splitter modules 22 to the module chassis 18, each splitter module 22 is received within one of the mounting slots 56 within splitter module chassis 18.

As shown in FIGS. 1-2, the module chassis 18 may be mounted at a slight angle relative to a rear area 16 of the block 10, and a slight angle relative to a side 11 of the block 10. The open end 13 may be both tipped to the open side 11 and tipped down. Such a positioning may improve cable management by not excessively bending the cables to and from each splitter module 22. The splitter modules 22 include a latch 58 for selective latching to module chassis 18. Details of how the module 22 latches to a mounting location 15 within the chassis 18 are described in further detail in U.S. Pat. No. 7,885,505, the entire disclosure of which has been incorporated herein by reference.

Referring to FIGS. 3-7, the fiber optic splitter module 22 includes a splitter module housing 60. Splitter module housing 60 includes a main housing portion 62 and the removable cover 48. Main housing portion 62 includes a first transverse sidewall 64 extending between a top wall 66, a bottom wall 68, a rear wall 70, and a front wall 72. Removable cover 48 defines a second transverse wall 74 of splitter module housing 60 and closes off an open side 76 of module main housing 62.

Cover 48 is mounted to main housing portion 62 by fasteners 78 through fastener mounts 80 defined on main housing portion 62. As noted above, the cover 48 extends beyond first transverse sidewall 64 to form a top mounting flange 52 and a bottom mounting flange 54 of splitter module 22. The bottom flange 54 of splitter module housing 60 and the corresponding mounting slot 56 on chassis 18 may be smaller in size than top flange 52 and the corresponding top slot 56 on chassis 18. Bottom slot 56 may be sized so that, while bottom flange 54 may be received within slot 56, the larger top flange 52 will not fit. This ensures that modules 22 are positioned within the chassis 18 in a particular desired orientation.

The rear wall 70 of main housing portion 62 includes a curved portion 82 configured to provide bend radius protection to cables within interior. Rear wall 70 of main housing 62 also includes an inset portion 84. In a version of the splitter module 22 wherein the inputs 44 are located in the rear, a pair of fiber optic connectors 86 may be positioned at inset portion 84 and protrude rearwardly from rear wall 70 for mating with fiber optic adapters for an input signal. In the version shown in FIGS. 3-7, the rear input locations 44 are plugged with inserts 88 and only the front input locations 44 are used. It should noted that in the version of the splitter module 22 shown in FIGS. 8-12 that is used to describe the inventive features of the adapter plate 90 of the present application, the rear wall 70 of the module 22 is shown populated with fiber optic connectors 86 even though the module 22 is being used as a front input module.

Still referring to FIGS. 3-7, the front wall 72 of module main housing 62 may be angled with regard to front opening 13 of chassis 18, which may aid in the direction of cables exiting module 22 toward a desired location. Each module 22 includes two cable exits/outputs 46 extending from front wall 72 of module main housing 62. As shown in FIG. 3, the cable exits 46 are slidably mounted to main housing 62 of module 22 and captured by cover 48 of module 22 when cover 48 is mounted to main housing 62. Cable exits 46 define a protruding rear lip 92 that is slidably inserted into slots 94 defined around front apertures 96 for accommodating cable exits 46. Cover 48 also includes slits 98 that receive rear lips 92 of the cable exits 46 to capture cable exits 46. Cable exits 46 permit telecommunications cables within module 22 to be directed outside of module 22. Cable exits 46 are normally sized thin enough to fit within the profile of the fiber optic splitter module 22 to preserve the density of the telecommunications assembly. As noted previously, the cables exiting the modules 22 that carry the split signals may include connectorized ends that are directed to adapter modules 32, such as shown in FIG. 7 and such as shown in the termination block 10 of FIG. 1. Although shown and described as being lead to sliding adapter modules 32 in the termination block 10, in other embodiments of high-density fiber distribution frames that include similar chassis, the terminated output ends can be lead to parking structures for storage for future connectivity, as described in further detail in U.S. Pat. No. 7,218,827, incorporated herein by reference in its entirety.

As noted above, the main housing 62 includes an integrally formed flexible latch 58 (i.e., cantilever arm) that is adapted to engage a portion of chassis 18 to hold module 22 within front opening 13 of chassis 18. Flexible latch 58 also deflects to permit withdrawal of module 22 from chassis 18. The latch 58 of module 22 includes a finger grip tab 100, a front latching tab 102, and a rear latching tab 104. Front latching tab 102 and rear latching tab 104 define a recess 106 thereinbetween. Rear latching tab 104 includes a ramped face 108 that causes latch 58 to elastically deflect down when module 22 is being inserted into chassis 18. Rear latching tab 104 also includes a square face 110 that opposes a square face 112 of front latching tab 102.

A front lip 114 defined by the mounting location 15 of chassis 18 is captured in recess 106 between the two latching tabs 102, 104 to hold module 22 in place within chassis 18. During insertion, as front lip 114 of chassis 18 clears ramped rear tab 104 and is captured in recess 106 between the two latching tabs 102, 104, latch 58 flexes back upwardly.

The removal of module 22 from chassis 18 is performed by pressing latch 58 downwardly to clear the square face 110 of rear tab 104 from lip 114 and sliding module 22 away from chassis 18. Module 22 includes a fixed grip tab 116 opposing and adjacent to flexible latch 58 to aid removal of module 22 from chassis 18. Fixed grip tab 116 is formed as a part of front wall 72 of module 22. Fixed grip tab 116 is positioned on module 22 opposite latch 58 so that a user may apply opposing force on latch 58 and fixed grip tab 116 to securely grasp module 22 and remove it from chassis 18. Fixed grip tab 116 is positioned on module 22 close enough to latch 58 so that a user may be able to apply the force with two adjacent fingers of the hand.

FIG. 3 shows an exploded view of fiber optic splitter module 22 illustrating the internal components of module 22. In the embodiment of the module shown, there are two input locations 44 for accommodating two terminated input cables 45. The front wall 72 of the module housing 60 defines two recesses 118 that are sized to accommodate the terminated cables 45. As shown in FIG. 3, the cover 48 includes two tabs 120 that are normally used to cover the recesses 118 located on the front wall 72 of the module housing 60. When the module 22 is used as a front-input module, the tabs 120 are cut to appropriate length to accommodate the cables 45 and capture the terminations within the recesses 118. In the embodiment of the module 22 shown in FIGS. 1 and 3-6, the front input cables 45 are arranged in a side-by-side configuration along a direction extending from the top wall 66 of the module 22 toward the bottom wall 68 of the module 22.

It should be noted that modules 22 may include front input locations 44 that are configured to receive input cables 45 in a stacked arrangement along a direction extending from the first sidewall 64 of the module toward the second sidewall 74 defined by the cover 48 of the module 22, examples of which are shown in U.S. Pat. No. 7,885,505, the entire disclosure of which has been incorporated herein by reference.

The optical component 50 (e.g., the splitter) is held against the interior of bottom wall 68 by a clamp 122 (i.e., bracket). Clamp 122 is mounted to a clamp mount defined on splitter module main housing 62 with fasteners (not shown). In the embodiment of the housing 60 shown in FIGS. 3 and 6, the clamp mount includes two pairs of mounting holes 124. Either the upper set of holes 124*a* or the lower set of holes 124*b* are utilized depending upon the size of the clamp 122 that will be used to hold optical component 50 against bottom wall 68. It should be noted that different optical components 50 may have different thicknesses and may require the use of different sized clamps 122 for holding the optical components 50 in place. In certain embodiments, two optical components 50 that are stacked on top of another may be used, in which case, a smaller clamp 122 would be used to hold the two optical components 50 in place.

Referring to FIGS. 3 and 6, the splitter module main housing 62 also includes integrally formed crimp holders 126 (e.g., slots) adjacent front wall 72 of housing 60 underneath radius limiter 128. Crimp elements 130 crimped to the ends of cables 47 that are split by splitter 50 are slidably received into crimp holders 126 as shown in FIG. 3. Crimp elements 130 define square flanges 132 between which is defined a recessed portion 134. The crimp holders 126 include complementary structure to the crimp elements 130 such that once the crimp elements 130 are slidably inserted into the crimp holders 126, the crimp elements 130 are prevented from moving in a longitudinal direction due to the flanges 132. Once slidably inserted, crimp elements 130 are held in place by cover 48 that is mounted to splitter module main housing 62. Other complementary shapes between the crimp elements 130 and the crimp holding slots 126 are also possible to provide a slidable fit and to prevent axial movement of the crimp elements 130 once inserted therein the crimp holders 126.

In FIGS. 3 and 6, the module 22 is shown without the cover 48 to illustrate the routing of fiber optic cables within module 22 when the module 22 is used as a front-input module. According to a sample routing, a first input cable 45 extends from the front input location 44 around a radius limiter 128 toward the rear wall 70 of the module 22. At the rear wall 70 of the module 22, the first cable 45 is looped around a radius limiter in the form of a spool 138. From the spool 138, the first cable 45 extends toward the front wall 72 of the module 22 and around the radius limiter 128 downwardly toward the optical component 50, mounted within module housing 60.

Optical component 50 within the module, as previously discussed, may be a splitter or another type of optical component. In the embodiment shown, optical component 50 is a fiber optic splitter that splits the signal of a single strand 45 to a plurality of secondary signals 47. First input cable 45 is received into the optical component 50 and the signal is split into a plurality of signals carried by a plurality of cables 47 that are bundled into a second cable 49. Second cable 49 extends from optical component 50 toward the rear wall 70 of the module 22 and is looped again all the way around spool 138 before heading toward crimp holders 126. A fiber retainer 140 may be used, as shown in FIG. 3, to keep the fiber optic cable 49 around the spool 138.

The bundled second cable 49 is separated into individual cables 47 as it leaves the spool 138. The individual cables 47 are crimped to output cables 51 at the crimp holders 126 and the output cables 51 exit the module 22 through module exits 46.

It should be noted that the routing of the fiber optic cables within module 22 as shown in FIGS. 3 and 6 is only one example, and other ways of routing the cables within the module 22 are possible.

As noted above, the fiber optic module 22 shown in FIGS. 1-7 is specifically configured to fit into chassis 18 that includes opposing slots 56 at the mounting locations 15 and that includes a lip 114 adjacent the front opening 13 thereof for interlocking with the latch 58 of the module 22. FIGS. 8-18 illustrate an adapter plate 90 that is configured to allow the fiber optic module 22 to be mounted to a chassis 142 that is different than the chassis 18 shown in FIG. 1. The adapter plate 90 is configured to be slidably and removably mounted on the exterior of the fiber optic module 22. The adapter plate 90 converts the configuration of the module 22 for installation in a type of telecommunications equipment that is different than the type of telecommunications equipment that the module 22 was initially designed for without the adapter plate 90 (e.g., the chassis 18 of the fiber termination block 10 shown in FIG. 1 that includes opposing slots 56 at the mounting locations 15 and a front lip 114 configured to engage the latch 58 of the module 22).

Figure 8:
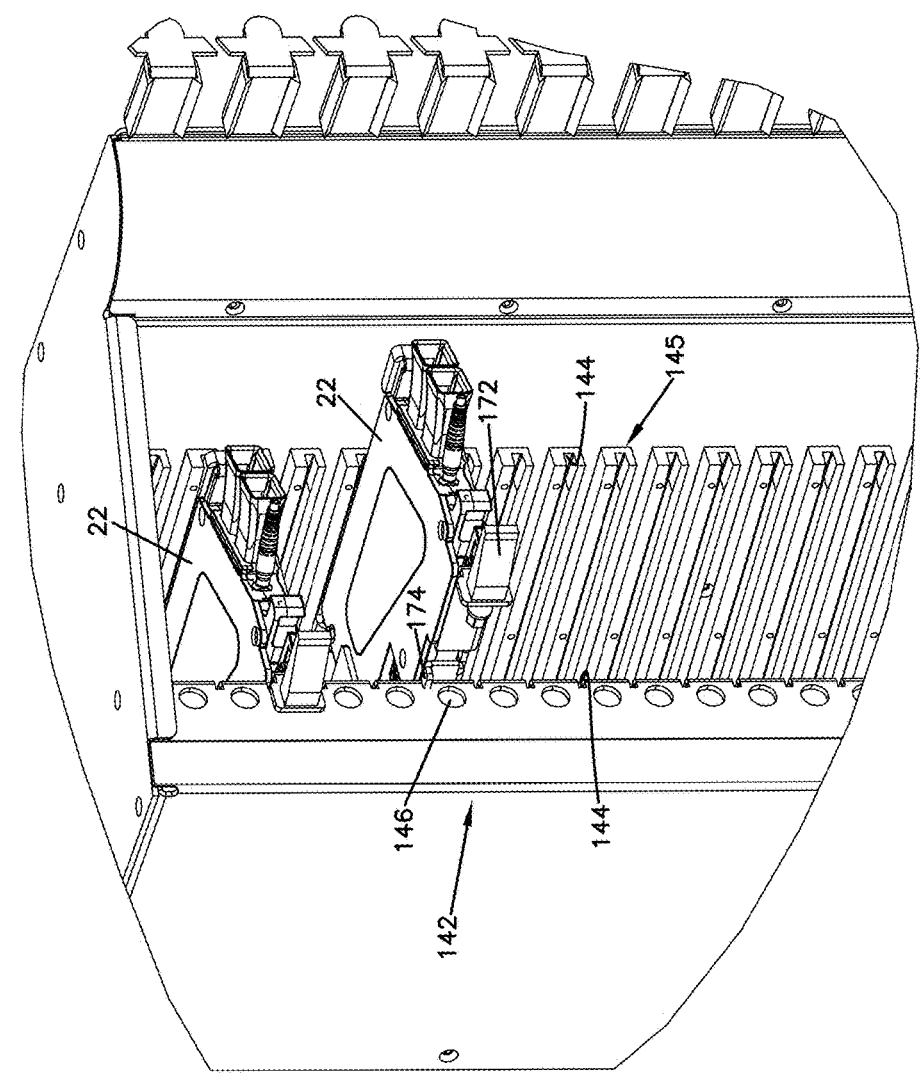
FIG. 8 illustrates the fiber optic module of FIGS. 1-7 installed in a second type of a module chassis with the use of an adapter plate having features that are examples of inventive aspects in accordance with the present disclosure.
Figure 9:
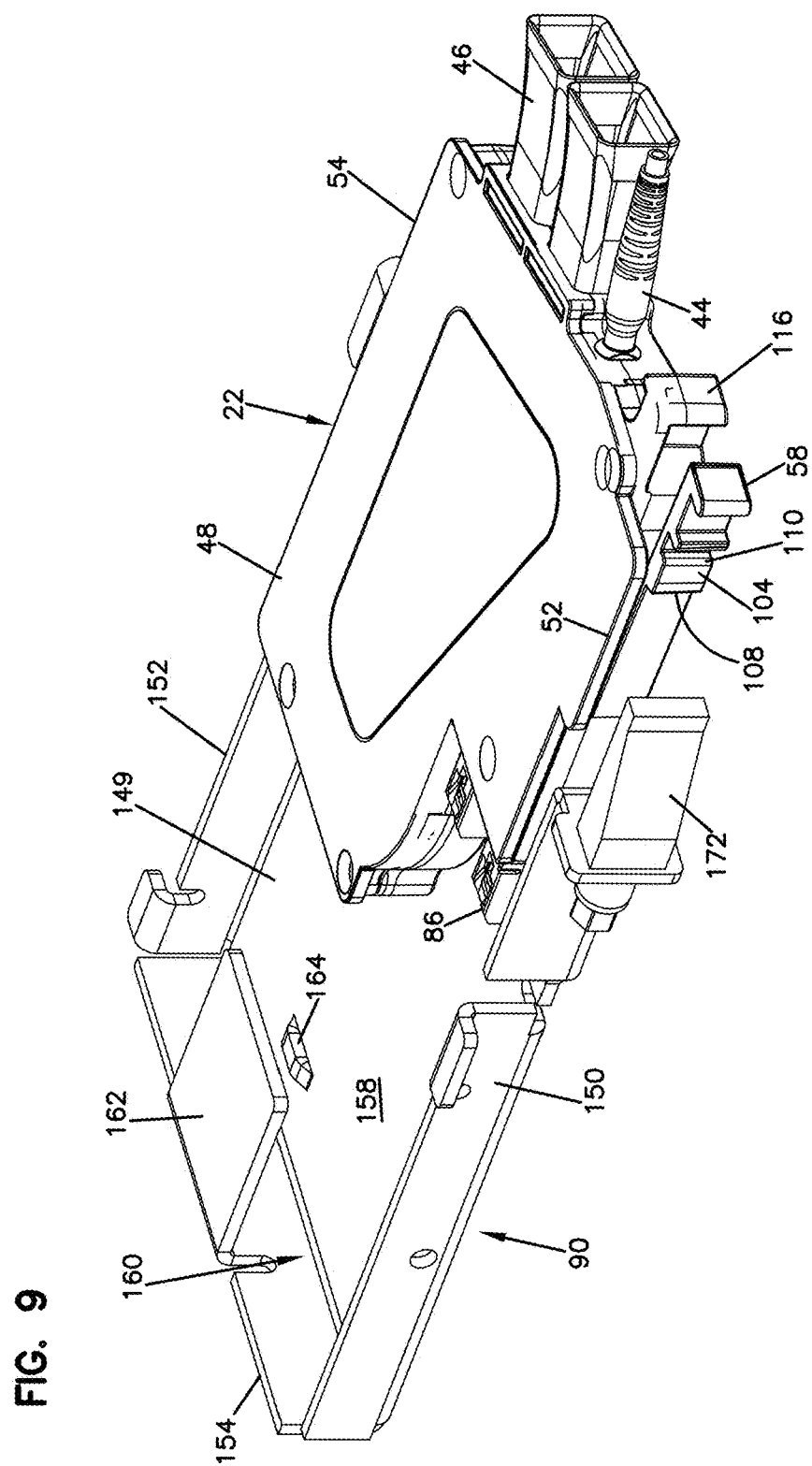
FIG. 9 illustrates the fiber optic module of FIGS. 1-7 partially installed in the adapter plate shown in FIG. 8.

Now referring to FIG. 8, the second chassis 142 that includes opposing mounting slots 144 is shown populated with a number of the splitter modules 22 discussed above. However, the chassis 142, unlike the chassis 18 of the termination block 10 of FIGS. 1-2, does not include front lips 114 that are configured to interlock with the integral latches 58 of the fiber optic modules 22, and the spacing between the mounting slots 144 is different than that of the type of chassis 18 shown in FIGS. 1-2. The spacing between the opposing slots 144 of a given mounting location 145 are different and the spacing between adjacent slots 144 of adjacent mounting locations 145 are different. Also, each mounting location 145 of the chassis defines an opening 146 that is configured to accept a swell-latch type of an interlock structure. As will be discussed in further detail, with the use of an adapter plate 90 having features that are examples of inventive aspects in accordance with the present disclosure, the modules 22, which are not normally designed for the type of chassis 142 shown in FIG. 8, can nevertheless be mounted within the chassis 142 shown in FIG. 8. A chassis similar to the second chassis 142 is shown and described in greater detail (see FIG. 66) in U.S. Pat. No. 6,760,531, the entire disclosure of which is incorporated herein by reference. The second chassis 142 might be used in a fiber telecommunications frame that is shown and described in U.S. Pat. No. 6,760,531 that might be configured for splicing, terminating, and managing/storing fiber optic cables within the frame.

The adapter plate 90 that allows the modules 22 to be converted between a module that is designed to be mounted to a first type of chassis (e.g., the chassis 18 of FIGS. 1-2) and a module that can be mounted into a second different type of a chassis (e.g., the chassis 142 of FIG. 8 similar to the chassis shown in U.S. Pat. No. 6,760,531) is shown in detail in FIGS. 9-18. In FIGS. 9-12, the adapter plate 90 is shown in combination with the splitter module 22, wherein the installation of the module 22 into the adapter plate 90 is illustrated. In FIGS. 13-18, the adapter plate 90 is shown in isolation.

Referring to FIGS. 8-18, the adapter plate 90 includes a body 149 defining a top wall 150, a bottom wall 152, a rear end 154, and an open front end 156 for receiving the fiber optic module 22. The adapter plate body 149 defines a first transverse wall 158. The adapter plate body 149 defines a second transverse side 160 that is generally open except for a retainer 162 that extends from the rear wall 154 toward the front end 156 of the adapter plate body 149. The adapter plate 90 is configured to slidably receive a module such as the module 22 described above from the open front end 156, wherein the retainer 162 at least partially helps retain the rear side of the module 22 against the adapter plate 90 (see FIGS. 10-11). The first transverse wall 158 defines a plurality of bumps 164 for providing a snug fit for the module 22 between the first transverse wall 158 and the retainer 162 of the plate 90. The first transverse wall 158 and the retainer 162 give the module 22 a thicker profile as defined between the two sides 64, 74 of the module 22 (see FIG. 12).

At the front end 156, the adapter plate body 149 defines an upper front wall 166 and a lower front wall 168. The upper front wall 166 includes an opening 170 for insertion of a swell-latch type of an interlock mechanism 172 (see FIGS. 8-12). The swell-latch 172 is configured to intermate with the openings 146 of the chassis 142 shown in FIG. 8. The swell-latch 172 is shown in FIGS. 8-12. The basic structure and operation of these types of latches are generally known to those of ordinary skill in the art and further details thereof will not be discussed herein.

Figure 10:
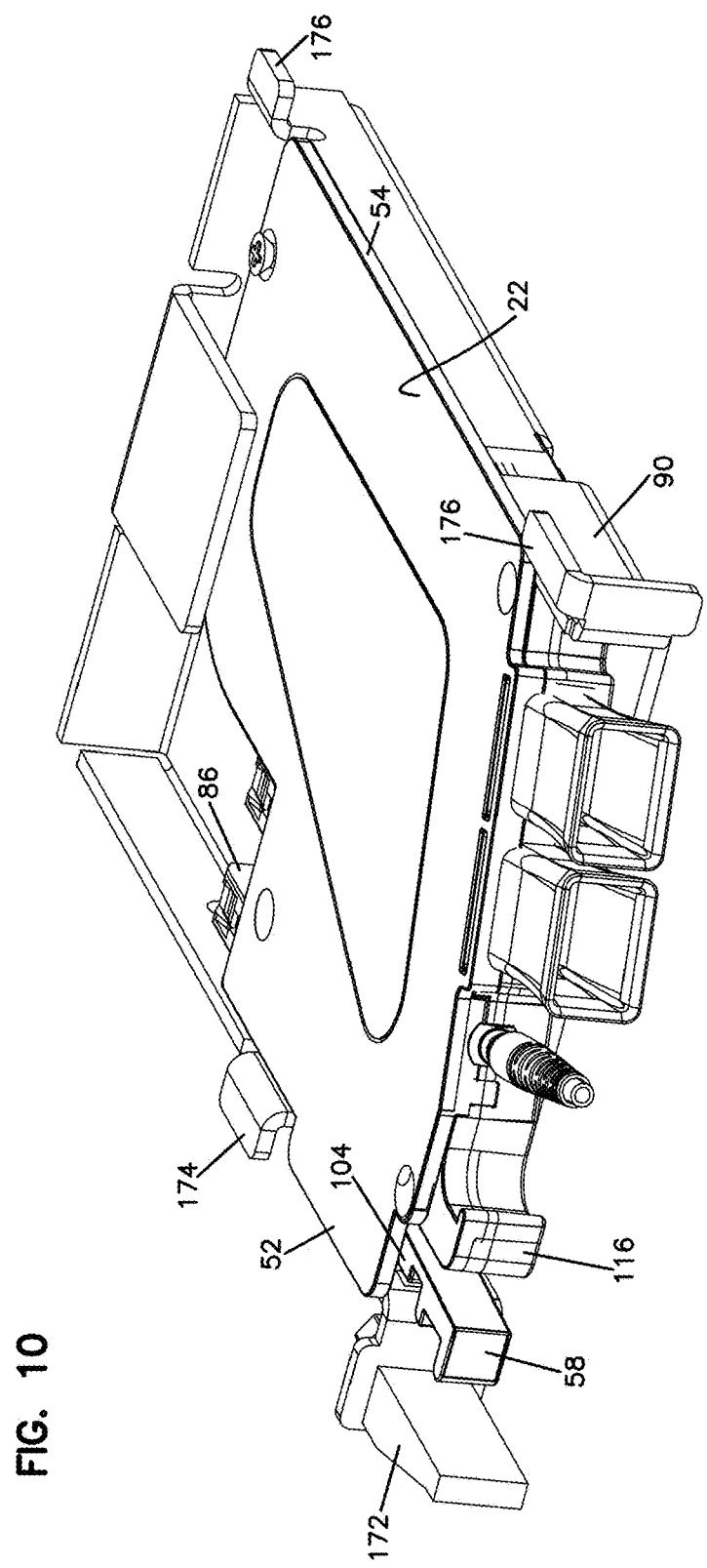
FIG. 10 illustrates the fiber optic module of FIG. 9 fully installed in the adapter plate of FIG. 9.
Figure 11:
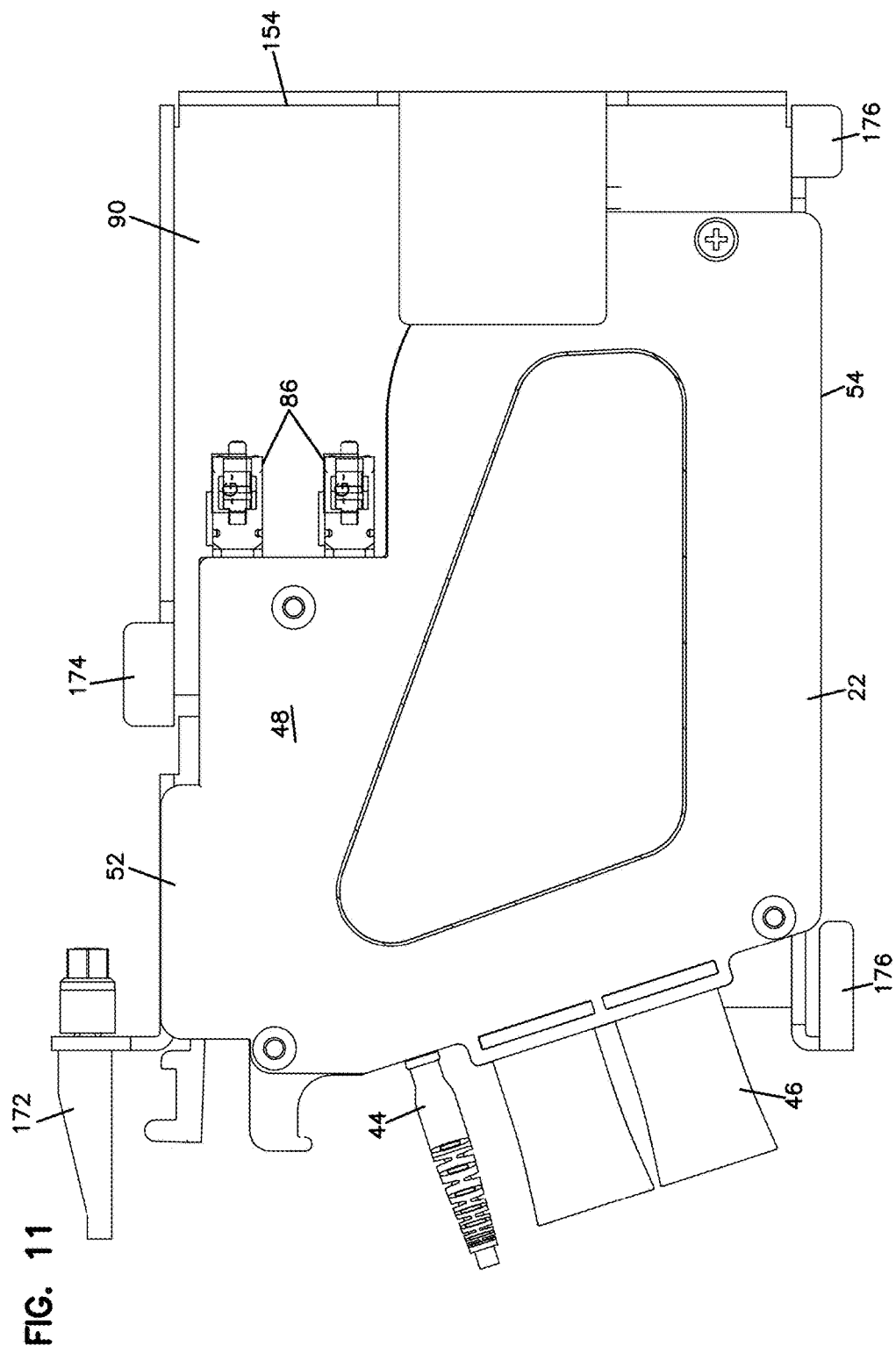
FIG. 11 is a right side view of the fiber optic module fully installed in the adapter plate of FIG. 10.
Figure 12:
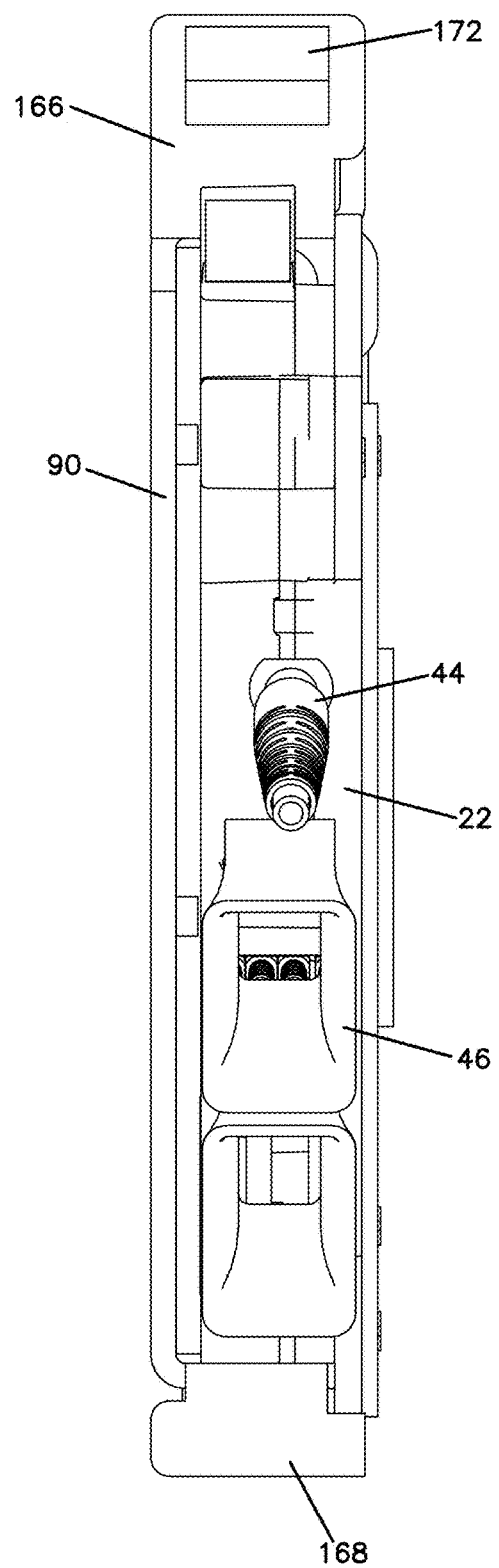
FIG. 12 is a front view of the fiber optic module fully installed in the adapter plate of FIG. 10.
Figure 13:
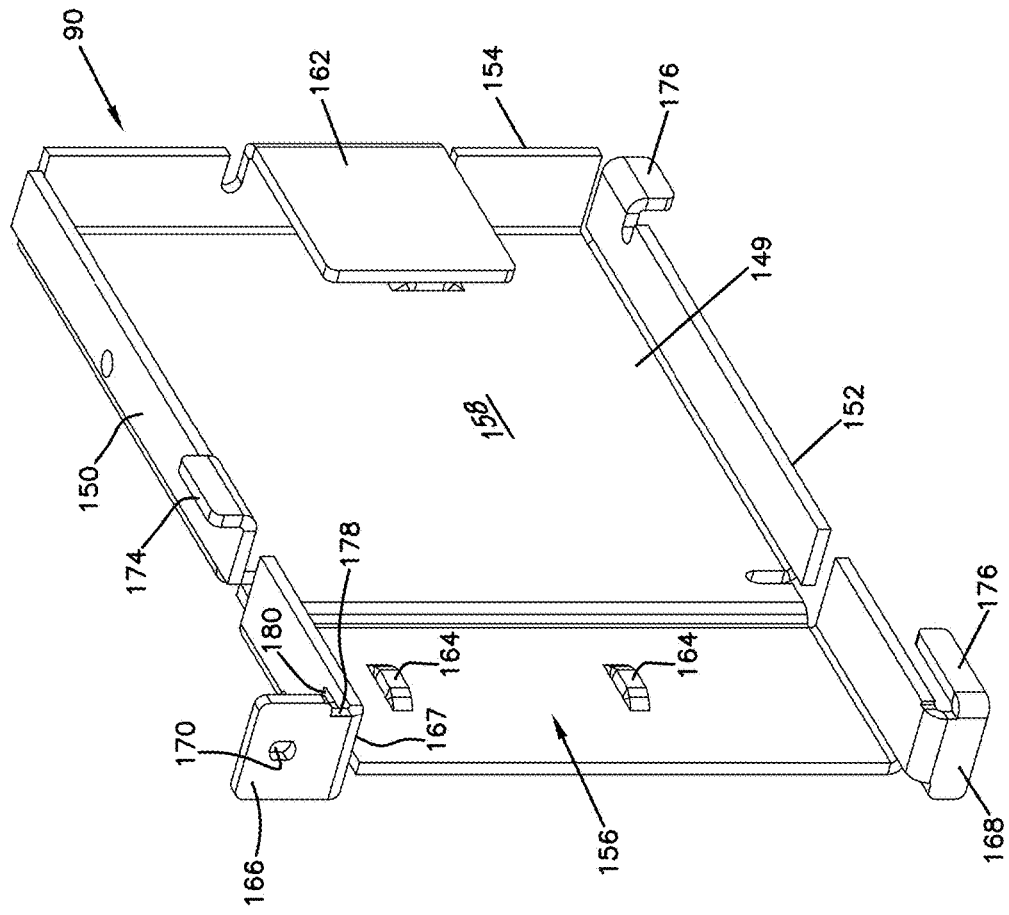
FIG. 13 is a front perspective view of the adapter plate of FIG. 10 shown in isolation, the adapter plate having features that are examples of inventive aspects in accordance with the present disclosure.
Figure 14:
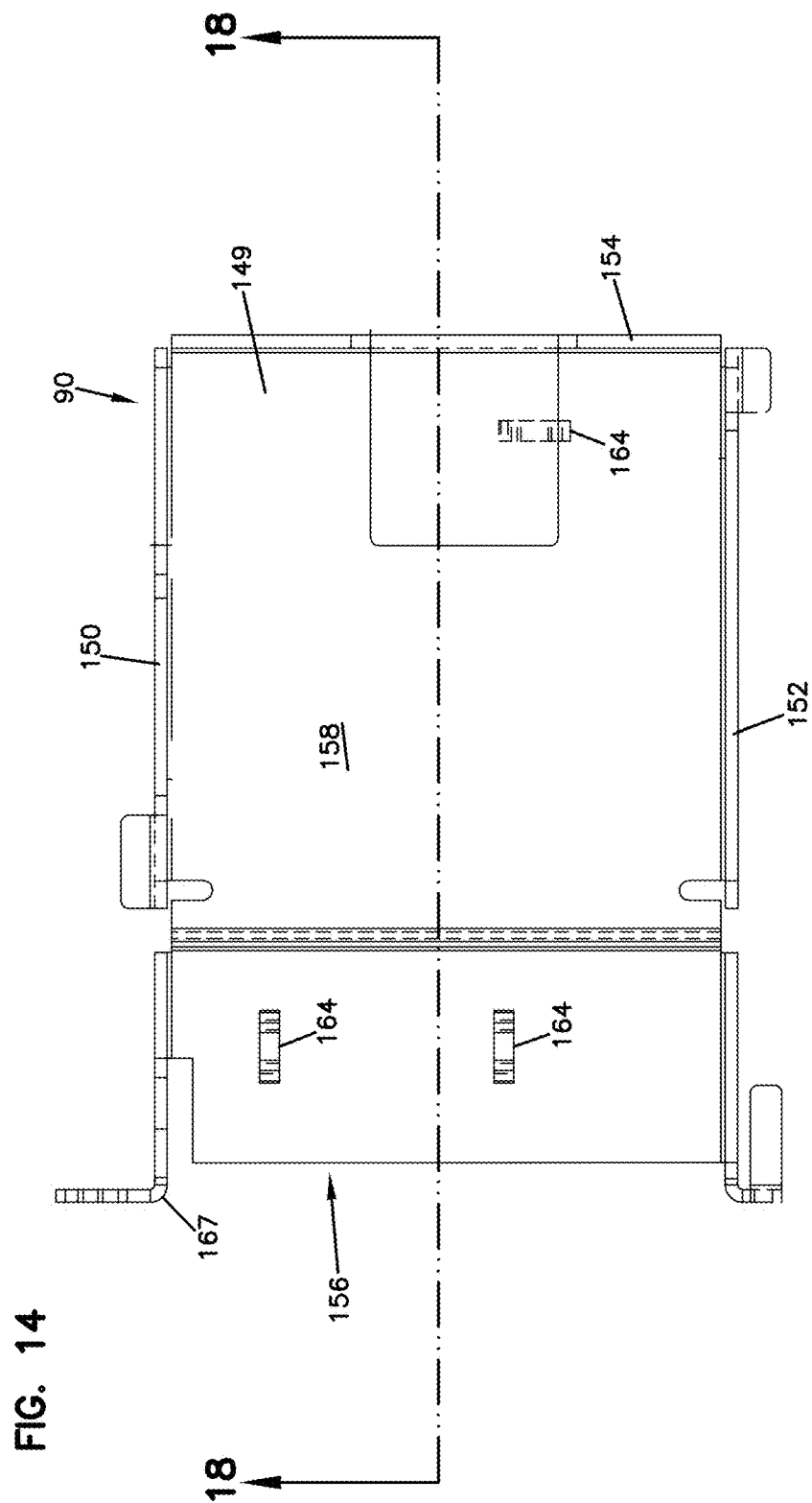
FIG. 14 is a right side view of the adapter plate of FIG. 13.
Figure 17:
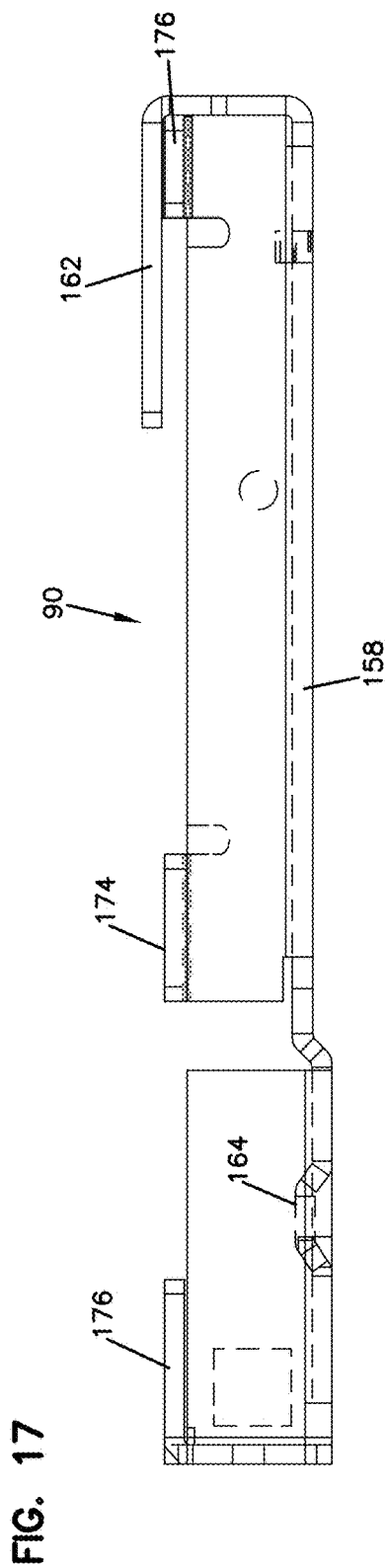
FIG. 17 is a bottom view of the adapter plate of FIG. 13.
Figure 18:
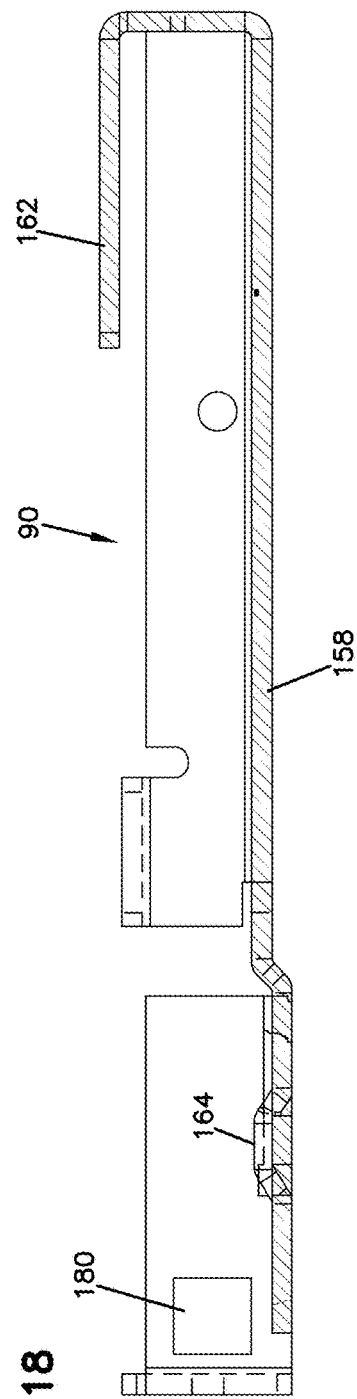
FIG. 18 illustrates a cross-section taken along line 18-18 of FIG. 14.

The adapter plate body 149 defines an upper flanges 174 and lower flanges 176 that are spaced and configured to slidably fit within the opposing slots 144 of a chassis such as the chassis 142 shown in FIG. 8. With the use of the adapter plate 90, the upper and lower flanges 174, 176 replace the upper and lower flanges 52, 54 of the splitter module 22 as the main guides that are used to guide the module 22 into a piece of telecommunications equipment. As shown in FIGS. 10 and 11, the upper flanges 174 and the lower flanges 176 of the adapter plate 90 are configured and spaced so as to accommodate the upper and lower flanges 52, 54 of the module when mounting the module 22 to the plate 90. The upper front wall 166 of the adapter plate 90 defines a notch 178 for allowing the upper flange 52 of the module 22 to fit beneath the upper front wall 166.

The top wall 150 of the adapter plate body 149 defines a slot 180 adjacent the upper front wall 166. The slot 180 is configured to intermate with the integral latch 58 of the module 22 for interlocking the module 22 with respect to the adapter plate 90. The slot 180 can be seen in detail in FIGS. 16 and 18. When a module 22 is slidably inserted into the adapter plate 90, the lower edge 167 of the upper front wall 166 of the adapter plate 90 causes the integral latch 58 of the splitter module 22 to elastically deflect down. The ramped face 108 of the rear latching tab 104 contacts the lower edge 167 of the upper front wall 166 and causes the latch 58 to elastically deflect down. Once the rear latching tab 104 of the integral latch 58 has cleared the upper front wall 166, the integral latch 58 of the splitter module 22 deflects back up as the rear latching tab 104 falls into slot 180 to lock the module 22 to the adapter plate 90. Once the integral latch 58 is used to lock the module 22 to the adapter plate 90, it is no longer used for locking the module 22 to other telecommunications equipment. In its place, the swell-latch 172 of the adapter plate 90 is used.

The flexible latch 58 also deflects to permit withdrawal of module 22 from adapter plate 90 when the module 22 is needed to be removed from the plate 90. The removal of module 22 from adapter plate 90 is performed by pressing latch 58 downwardly to clear the square face 110 of rear tab 104 from the slot 180 of the adapter plate 90 and sliding module 22 away from adapter plate 90. The fixed grip tab 116 opposing and adjacent to flexible latch 58 aids in removal of module 22 from adapter plate 90. A user may apply opposing force on latch 58 and fixed grip tab 116 to securely grasp module 22 and slidably remove it from adapter plate 90. The fixed grip tab 116 is positioned on module 22 close enough to latch 58 so that a user may be able to apply the force with two adjacent fingers of the hand.

As noted above, with the adapter plate 90 shown in FIGS. 8-18, if the module 22 is populated with rear input connectors 86, those connectors 86 do not have to be removed prior to insertion into the adapter plate 90. As shown in FIGS. 10-11, the adapter plate 90 includes room adjacent the rear end 154 of the plate body 149 for accommodating the rear connectors 86 of the module 22. The open front end 156 of the adapter plate body 149 allows all of the front inputs 44 and the outputs 46 to remain unchanged. As discussed above, the terminated output cables can be routed through frames featuring the chassis 142 and coupled to equipment such as sliding adapter modules for connectivity. In other embodiments of high-density fiber distribution frames that include chassis similar to chassis 142, the terminated output ends can be lead to parking structures for storage for future connectivity, as described in further detail in U.S. Pat. No. 7,218,827, incorporated herein by reference in its entirety.

It should be noted that although the illustrated example of the module 22 that is mounted to the adapter plate 90 is a front-input module, since the adapter plate 90 provides room adjacent the rear end 154 of the plate body 149, a module that is configured as a rear-input module with rear cable terminations can be used with the adapter plate 90 in a chassis such as the chassis 142 shown in FIG. 8.

Thus, with the use of an adapter plate 90 as shown in FIGS. 8-18, a telecommunications module such as the module 22 of FIGS. 3-7, which is configured for installation in a first type of chassis 18, is able to be installed in a second type of chassis 142 without having to modify the external and internal features of the module 22.

Although in the foregoing description, terms such as "top," "bottom," "front," "back," "right," "left," "upper," and "lower were used for ease of description and illustration, no restriction is intended by such use of the terms. The telecommunications devices described herein can be used in any orientation, depending upon the desired application. For example, even though the splitter module housing 60 is described as including a "top wall" 66 and a "bottom wall 68," the top and bottom walls might be oriented in a horizontal plane when mounting the splitter module into a chassis, as shown in FIG. 8. Such terms are used for ease of description and no restriction is intended by such use of the terms.

The above specification, examples and data provide a complete description of the manufacture and use of the disclosure. Since many embodiments of the disclosure can be made without departing from the spirit and scope of the inventive aspects, the inventive aspects resides in the claims hereinafter appended.

What is claimed is:

1. An adapter plate for use with a telecommunications module that is configured to be slidably inserted into a first type of telecommunications chassis, the telecommunications module defining first upper and lower flanges for slidable insertion into opposing mounting slots of the first type of telecommunications chassis, the adapter plate comprising:
   a body configured to be mounted to the telecommunications module, wherein the body of the adapter plate includes structure for mounting the telecommunications module to a second type of telecommunications chassis that is different than the first type of telecommunications chassis, wherein the telecommunications module is not configured to be mounted to the second type of telecommunications chassis without the use of the adapter plate, wherein the body of the adapter plate defines a second upper vertical mounting flange and at least one second lower vertical mounting flange that is along the same vertical plane as the second upper vertical mounting flange, the second upper and lower vertical mounting flanges being for slidable insertion into opposing mounting slots of the second type of telecommunications chassis, wherein the first upper and lower flanges of the telecommunications module are not configured to fit the mounting slots of the second type of telecommunications chassis, such that the second upper and lower vertical mounting flanges of the adapter plate are configured to replace and be used instead of the first upper and lower flanges of the telecommunications module when the telecommunications module has been mounted to the adapter plate for slidable insertion into the opposing mounting slots of the second type of telecommunications chassis.

2. An adapter plate according to claim 1, wherein the body of the adapter plate is removably mounted to the telecommunications module.

3. An adapter plate according to claim 1, wherein the adapter plate is slidably mounted to the telecommunications module.

4. An adapter plate according to claim 1, wherein the telecommunications module includes a flexible latch for interlocking with the first type of telecommunications chassis, wherein the telecommunications module is configured to be interlocked with the adapter plate using the flexible latch, the adapter plate including a second latch for interlocking with the second type of telecommunications module.

5. An adapter plate according to claim 4, wherein the flexible latch of the telecommunications module includes an integral cantilever arm and the second latch of the adapter plate includes a swell-latch.

6. An adapter plate according to claim 1, wherein the adapter plate body defines a top wall, a bottom wall, a rear wall, a first transverse sidewall, and an open front end, wherein the telecommunications module is configured to be inserted into the body of the adapter plate through the open front end.

7. An adapter plate according to claim 6, further comprising a retainer wall parallel to the first transverse wall, the telecommunications module to be captured between the retainer wall and the first transverse wall with a friction fit when the adapter plate is mounted to the telecommunications module.

8. An adapter plate according to claim 1, wherein the telecommunications module is mounted to the adapter plate and the telecommunications module includes a fiber optic splitter that splits an input signal into a plurality of the same output signals.

9. An adapter plate according to claim 1, wherein the telecommunications module is mounted to the adapter plate and the telecommunications module includes an optical wavelength division multiplexer/demultiplexer.

10. An adapter plate for use with a telecommunications module that includes a flexible latch for interlocking with a first type of telecommunications chassis, the telecommunications module defining first upper and lower flanges for slidable insertion into opposing mounting slots of the first type of telecommunications chassis, the adapter plate comprising:
a body configured to be mounted to the telecommunications module and interlocked with the telecommunications module using the flexible latch of the telecommunications module, wherein the body of the adapter plate includes a second latch for interlocking with a second type of telecommunications chassis that is different than the first type of telecommunications chassis, wherein the flexible latch of the telecommunications module is not configured for interlocking with the second type of telecommunications chassis, wherein the body of the adapter plate defines a second upper vertical mounting flange and at least one second lower vertical mounting flange that is along the same vertical plane as the second upper vertical mounting flange, the second upper and lower vertical mounting flanges being for slidable insertion into opposing mounting slots of the second type of telecommunications chassis, wherein the first upper and lower flanges of the telecommunications module are not configured to fit the mounting slots of the second type of telecommunications chassis, such that the second upper and lower vertical mounting flanges of the adapter plate are configured to replace and be used instead of the first upper and lower flanges of the telecommunications module when the telecommunications module has been mounted to the adapter plate for slidable insertion into the opposing mounting slots of the second type of telecommunications chassis.

11. An adapter plate according to claim 10, wherein the body of the adapter plate is removably mounted to the telecommunications module.

12. An adapter plate according to claim 10, wherein the flexible latch of the telecommunications module includes an integral cantilever arm and the second latch of the adapter plate includes a swell-latch.

13. An adapter plate according to claim 10, wherein the adapter plate body defines a top wall, a bottom wall, a rear wall, a first transverse sidewall, and an open front end, wherein the telecommunications module is configured to be inserted into the body of the adapter plate through the open front end.

14. An adapter plate according to claim 13, further comprising a retainer wall parallel to the first transverse wall, the telecommunications module to be captured between the retainer wall and the first transverse wall with a friction fit when the adapter plate is mounted to the telecommunications module.

15. An adapter plate according to claim 10, wherein the telecommunications module is mounted to the adapter plate and the telecommunications module includes a fiber optic splitter that splits an input signal into a plurality of the same output signals.

16. An adapter plate according to claim 10, wherein the telecommunications module is mounted to the adapter plate and the telecommunications module includes an optical wavelength division multiplexer/demultiplexer located within the interior.

17. A telecommunications device comprising:
a telecommunications module that includes a first interlock structure in the form of a flexible latch that is configured for mounting to a first type of telecommunications chassis, the telecommunications module including a fiber optic splitter that splits an input signal into a plurality of the same output signals, the telecommunications module further defining first upper and lower flanges that are configured for slidable insertion into opposing mounting slots of the first type of telecommunications chassis; and
an adapter structure removably mounted to the telecommunications module using the first interlock structure, wherein the adapter structure includes a second interlock structure in the form of a swell-latch for mounting to a second type of telecommunications chassis that is different than the first type of telecommunications chassis, wherein the telecommunications module cannot be mounted to the second type of telecommunications chassis with the first interlock structure, wherein the adapter structure defines a second upper vertical mounting flange and at least one second lower vertical mounting flange that is along the same vertical plane as the second upper vertical mounting flange, the second upper and lower vertical mounting flanges being for slidable insertion into opposing mounting slots of the second type of telecommunications chassis, wherein the first upper and lower flanges of the telecommunications module are not configured to fit the mounting slots of the second type of telecommunications chassis, such that the second upper and lower vertical mounting flanges of the adapter structure are configured to replace and be used instead of the first upper and lower flanges of the telecommunications module when the telecommunications module has been mounted to the adapter structure for slidable insertion into the opposing mounting slots of the second type of telecommunications chassis.

* * * * *